Figure 1:
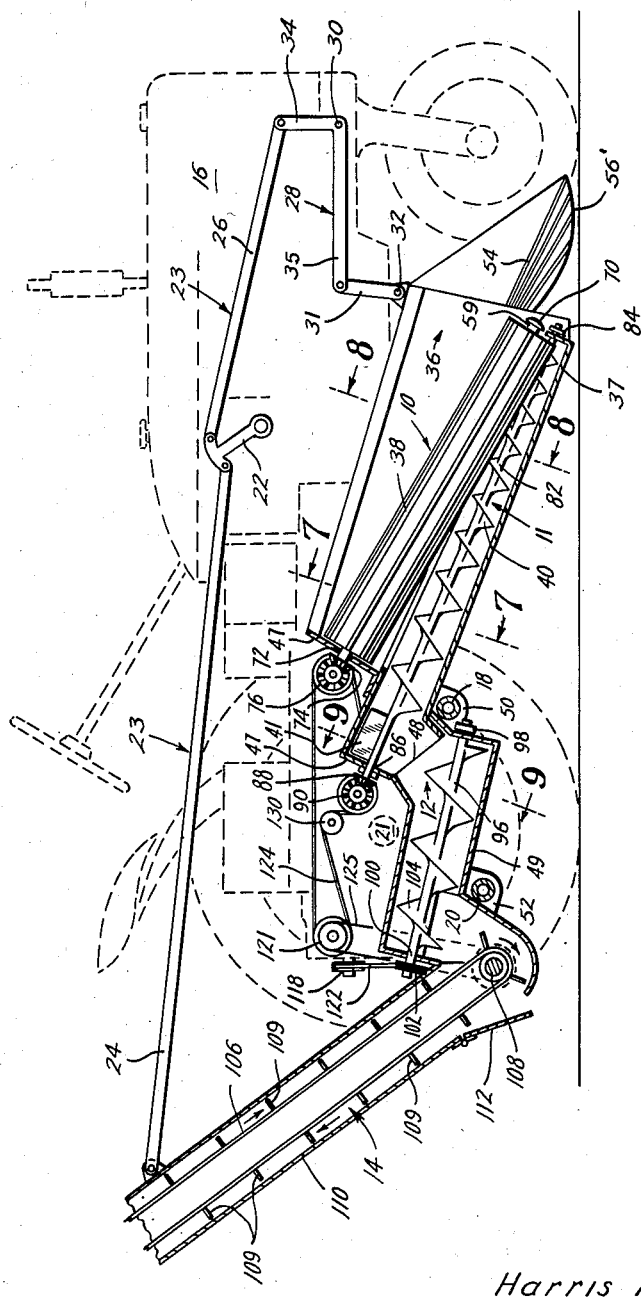

March 4, 1958  H. P. SMITH  2,825,197
COTTON PICKER ROLLS
Filed Nov. 27, 1953  4 Sheets-Sheet 1

Harris P. Smith
INVENTOR.
BY James F. Weiler
ATTORNEY

March 4, 1958
H. P. SMITH
2,825,197
COTTON PICKER ROLLS
Filed Nov. 27, 1953
4 Sheets-Sheet 2
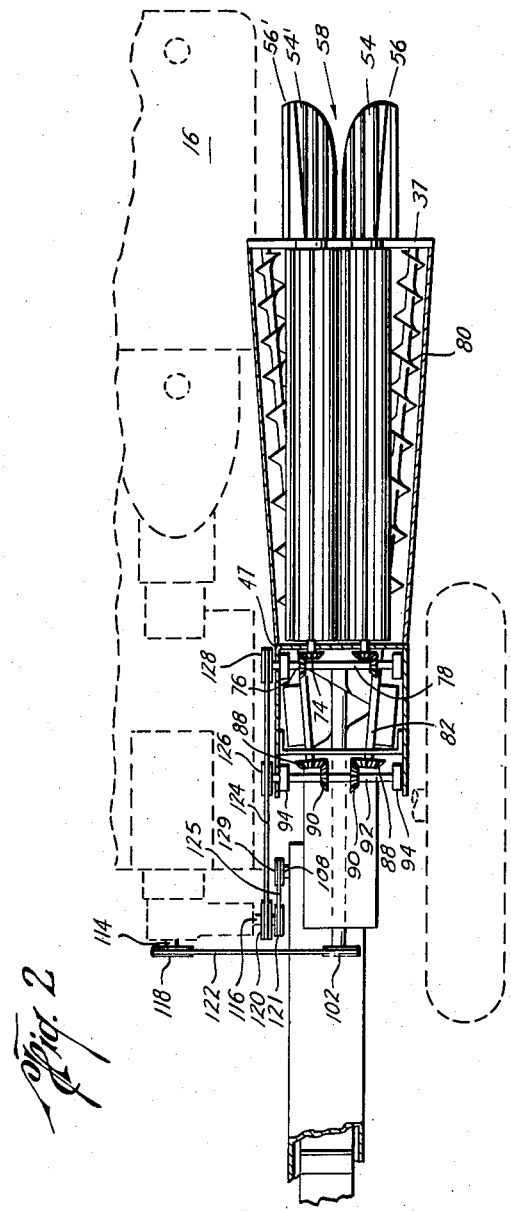
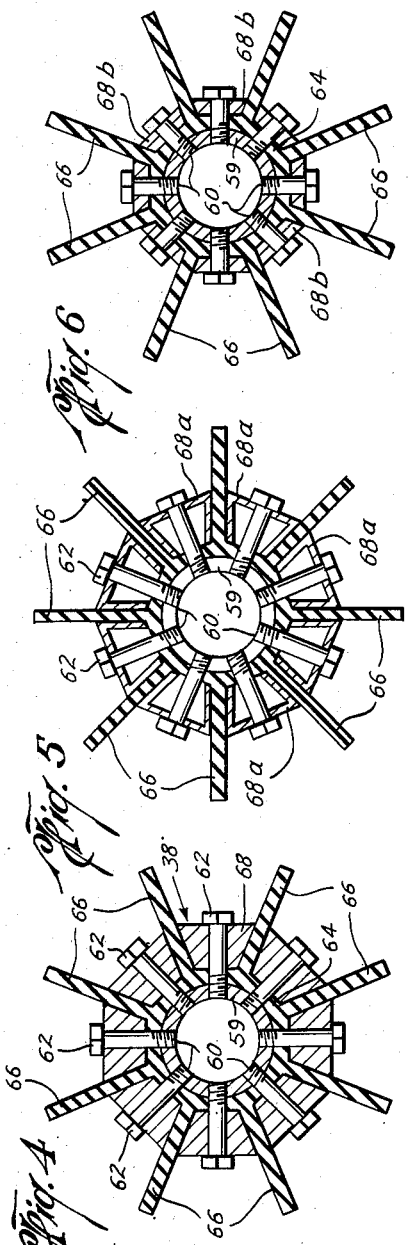
Harris P. Smith
INVENTOR.
BY James F. Wiler
ATTORNEY Harris P. Smith
INVENTOR.

BY James F. Weiler
ATTORNEY

March 4, 1958  H. P. SMITH  2,825,197
COTTON PICKER ROLLS
Filed Nov. 27, 1953  4 Sheets-Sheet 4
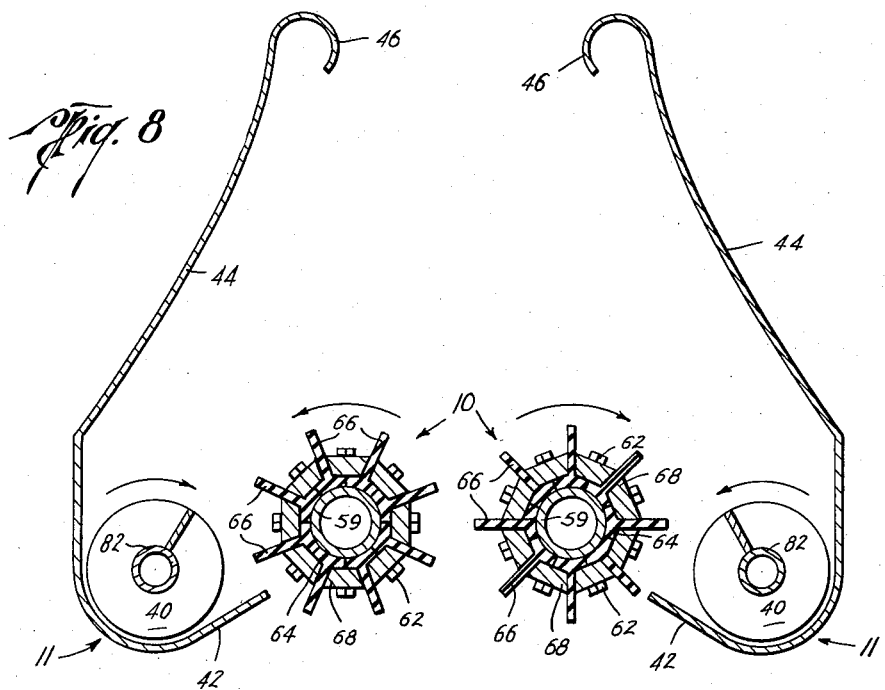
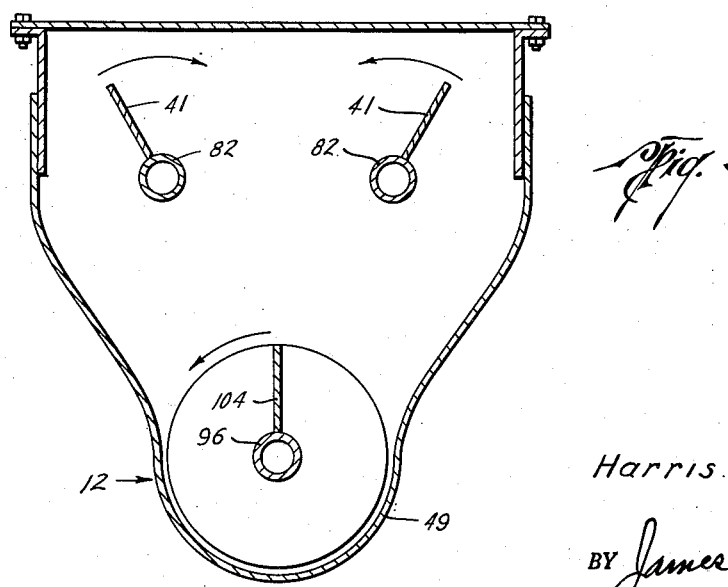
Harris P. Smith
INVENTOR.
BY James F. Weiler
ATTORNEY United States Patent Office 2,825,197
Patented Mar. 4, 1958

2,825,197

COTTON PICKER ROLLS

Harris P. Smith, College Station, Tex., assignor to Texas A & M Research Foundation, College Station, Tex., a corporation of Texas Application November 27, 1953, Serial No. 394,766

4 Claims. (Cl. 56—33)

The present invention relates to improved cotton strippers and improved cotton stripping rollers used therein to remove cotton bolls from cotton plants.

In general, there are two types of mechanical cotton harvesters, the cotton picker and the cotton stripper. The cotton picker picks the cotton from the bolls and the cotton stripper strips the bolls from the cotton plants. The present invention is directed to improvements in the cotton stripper type apparatus.

For a number of years there has been considerable activity in an effort to improve the mechanical harvesting of cotton in both the picker and stripper type harvesters. In general, it is desirable to provide a mechanical cotton harvester which picks or strips as much cotton as possible with as little damage as possible to the plant and cotton or cotton bolls and which collects a minimum of trash or foreign matter. In addition, such a cotton harvester should be economical to manufacture, maintain and operate, should be of simplified construction and rugged and durable in use. The mechanical cotton harvester should be readily elevated for making turns and the like, and should be quickly and easily mounted on or dismounted from a tractor or like vehicle in the event it is of the type which is mounted on a vehicle of some type.

Some cotton strippers utilize rollers which are feathered longitudinally of their axes of rotation, which feathers project from the roller cylinders in radial directions. Ordinarily, a pair of rollers are utilized in which the feathers of one roller are in interleaving or intermeshing relation with the feathers of the other roller. As an example of such rollers reference is made to United States Letters Patent No. 908,637 issued January 5, 1909 to Appleby which utilizes rollers of this type in which the feathers are made of a rigid material, the rigid feathers contacting the bolls in the plant and the cylindrical portion of each roller acting as a resisting surface for the feathers of the companion roller. In this type of construction the feathers bend the plants as they pass between the pair of rollers to remove the bolls from the plants. This type of construction is not very efficient in that a relatively low amount of cotton bolls are stripped from the plant and considerable damage is done to the plant and bolls by the rigid blades or feathers of the rollers.

While the steel roll is still used and is standard equipment in certain commercial cotton strippers, recently stripping rolls in which fiber brush, such as Tampico Fiber, or nylon bristles have been developed. As will be apparent later, the brush type rolls are more efficient than the steel type rolls; however, it is desirable to increase the efficiency of stripping rollers so that a higher percentage of bolls are stripped while at the same time providing a minimum of damage to the plants and bolls.

It is therefore a principal object of the present invention to provide a cotton stripper with stripping rolls or rollers which are more efficient and do less damage to the plant and bolls than those of the prior art.

It is a further object of the present invention to provide a cotton stripper provided with stripper rolls or rollers which strip the bolls from the plant by a combination of wiping, batting and paddling action.

It is yet a further object of the present invention to provide a cotton stripper having cotton stripper rolls provided with feathers or fingers projecting radially from the roller cylinders and which preferably occupy planes that are parallel with or include the axes of the rollers, such feathers or fingers being flexible enough to permit cotton plants to pass between a pair of such rollers yet at the same time "lick" the bolls from the plants.

It is yet a further object of the present invention to provide a cotton stripper having stripper rolls or rollers of the mentioned character in which the fingers or feathers are long and flexible so that the entire plant is not stripped, that is, the green bolls are left on the plant and a minimum of trash is collected.

Conventionally, cotton strippers are mounted on tractors and other vehicles so that they might be propelled along rows of cotton to perform the stripping action. The mountings by which the stripper unit is mounted on the tractor or like vehicles is complicated and requires complicated linkage arrangements and is difficult of lateral adjustment. Similarly, the mounting of the usual elevator auger conveyor unit on the tractor or like vehicles is complicated and requires complicated linkage arrangement. Also, it would be desirable to provide means for raising the stripper and elevator simultaneously so that the stripper unit may be raised for turns and the elevator may be raised to clear high sides of the trailing hopper.

It is therefore a further object of the present invention to provide a stripper unit which may be mounted and a mounting therefor on a single pipe or support on the side of the tractor or like vehicle so that the stripper unit can be attached and detached quickly and easily, and so that a minimum of linkage is required for mounting the stripper.

It is yet a further object of the present invention to provide the stripper unit which may be mounted on the tractor by a single pipe or support so that the stripper unit may easily be adjusted laterally to accommodate wheel setting and clearance between the tractor or like vehicle and the wheel.

It is yet a further object of the present invention to place the pipe or support of the tractor or like vehicle near the rear of the stripper and under the cross-shaft drive so that there is only a small amount of movement up and down of the drive sheaves when the machine is raised and lowered, whereby any difference in the drive belt tension can be compensated for by a spring loaded movable belt idler.

It is yet a further object of the present invention to provide a cotton stripper which is mounted centrally on a side of the tractor and in front of the operator thereby giving full vision of the plants flowing into the throat of the stripper unit.

It is yet a further object of the present invention to provide a stripper unit and a mounting therefor by which a pair of strippers may be mounted, one on each side of the tractor with only minor changes, so that two rows of cotton plants can be harvested at the same time.

It is yet a further object of the present invention to mount the elevator-auger conveyor unit on a single pipe or support extending from the rear of the tractor or other vehicle so that the elevator-extension-auger conveyor unit can be mounted and dismounted and adjusted laterally quickly and easily.

It is yet a further object of the present invention to mount the stripper unit and the elevator unit on a side of the tractor or like vehicle and to connect these units to the hydraulically actuated rocking or crank arm on the side of the tractor so that the stripper and elevator are raised and lowered simultaneously so that when the stripper unit is raised for making turns, the elevator is simultaneously raised to clear high trailer box sides of the hopper being towed by the tractor.

It is a feature of the present invention to provide a V-belt drive which serves as a safety clutch, as it will slip in the sheaves, thereby eliminating the snap clutch type of safety clutch, and to provide a V-belt drive in which variable size sheaves may separately be interchanged for either the stripper rolls or for the conveyor-augers to accommodate different harvesting conditions and volumes of cotton. Thus, the slipping of the V-belt in the sheaves provides a safety clutch action, and replacement of individual sheaves permits of different drive requirements, as desired.

Yet a further feature and advantage of the present invention is the provision of a variable sheave at the drive pulley thereby permitting changing the speed of the stripper rolls and the conveyor-augers uniformly, if desired, and so mounting the idler sheave so that belt tension will be released when the stripper is raised thereby automatically throwing the stripper and elevator "out of gear" and permit them to stop so that cotton that may be in the conveyor-augers will not be carried back, elevated and dropped on the ground while turning at the end of rows.

Figure 3:
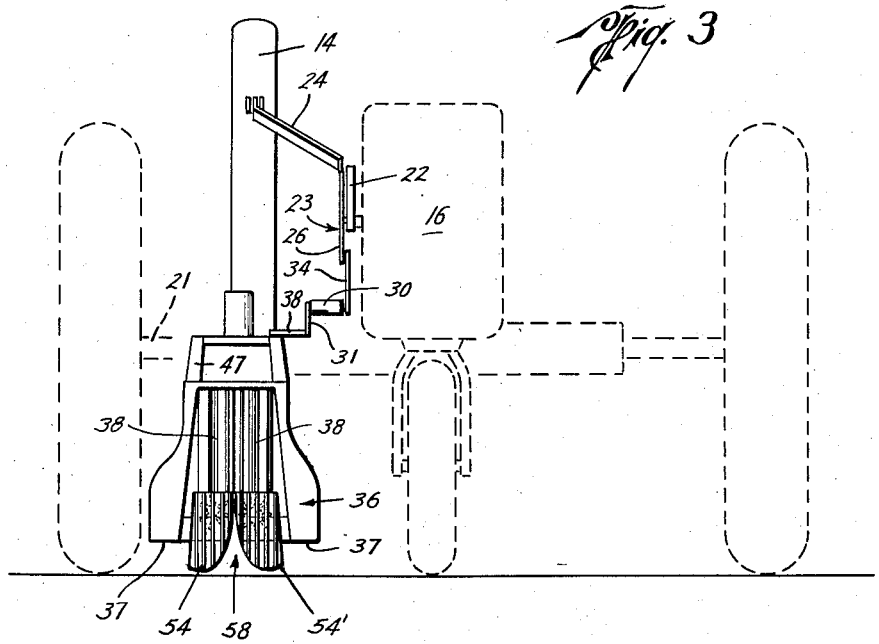
Figure 7:
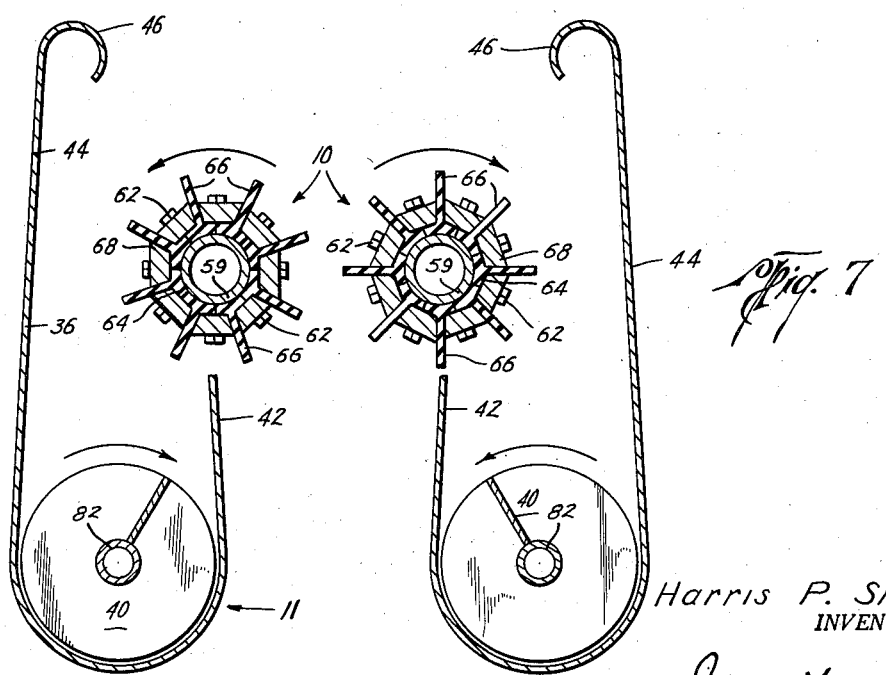

Other objects, features and advantages will be apparent from the following description of examples of the invention, given for the purpose of disclosure, taken in connection with the accompanying drawings, where Figure 1 is a side elevation, partly in section, illustrating a cotton stripper and tapered auger-conveyor constructed according to the invention and illustrated mounted on the side of a conventional tractor according to the invention, Figure 2 is a fragmentary plan view, partly in section, illustrating the apparatus and mounting of Figure 1, Figure 3 is a front elevational view of the apparatus and mounting of Figures 1 and 2, Figure 4 is an end elevational view with parts broken away and shown in section of a preferred form of a cotton stripper roller according to the invention, Figure 5 is a view similar to that of Figure 4 but illustrates a modification, Figure 6 is an enlarged view similar to that of Figures 4 and 5 but illustrates a still further modification of a cotton stripper roller according to the invention, Figure 7 is an enlarged cross-sectional view taken along the line 7—7 of Figure 1 and looking in the direction of the arrows, Figure 8 is an enlarged cross-sectional view taken along the line 8—8 of Figure 1 and looking in the direction of the arrows, and Figure 9 is a cross-sectional view taken along the line 9—9 of Figure 1 and looking in the direction of the arrows.

Referring now to the drawings, and particularly to Figure 1, the reference numeral 10 designates generally a cotton stripping unit illustrated in combination with a tapered auger type conveyor 11 for reception and rearward movement of stripped cotton bolls, an extension-auger conveyor 12, and an elevator 14, all shown mounted on the side of a conventional tractor 16, the stripper unit 10 and auger-conveyor 11 being pivotally secured thereto and supported therefrom by the pipe or pivot support 18 extending laterally from the tractor 16, and the extension-auger conveyor 12 and elevator 14 being pivotally secured and supported by the pipe or pivot support 20 disposed rearwardly of the support 18, the support 20 extending laterally from the tractor adjacent the rear end thereof. The pivot supports 18 and 20 may be secured to the tractor 16 in any desired manner, for example, the pivot support 18 may be bolted or otherwise secured to the framework of the tractor, and the pivot support 20 may be secured to and depend from the rear axle 21 of the tractor by suitable linkage, not shown, although the supports may be secured to the tractor in other ways.

Ordinarily and conventionally a rocker or crank arm 22 is provided on tractors and suitable linkage 23 is connected from the rocker arm 22 to the elevator 14 and the stripper unit 10 so that forward movement (that is, movement to the right or in a clockwise direction when viewing Figure 1) causes elevation of the upper end of the elevator 14 about the pivot support 10 and simultaneous elevation of the front end of the stripper unit 10 about the pivot support 18.

As illustrated, this linkage 23 may include an arm 24 which may pivotally be secured to an inner upper surface of the elevator 14 and one end of the rocker or crank arm 22 and a corresponding link arm 26 which may pivotally be secured to the other side of the rocker or crank arm 22 and to the bell crank 28 pivotally secured at 30 to the frame of the tractor 16. The other end of the crank arm is pivotally secured to the downwardly extending link arm 31 whose lower end is pivotally secured at 32 to the front of the stripper unit 10. Thus, counterclockwise or forward movement of the rocker arm 22, as mentioned, moves the arm 24 forwardly thereby moving the rearward end of the elevator 14 upwardly and simultaneously moves leg 34 of the bell crank 28 forwardly thereby elevating leg 35 of the bell crank 28 thereby pivoting the stripper unit 10 about the pivot support 18 and moving the forward end of the stripper unit 10 and auger-conveyor 11 upwardly.

As mentioned before, it is highly advantageous to simultaneously move the elevator 14 and stripper unit 10 and conveyor 11 upwardly and downwardly substantially simultaneously so that in making turns only a single actuating force is necessary. This is particularly advantageous in making turns as the front end of the stripper and conveyor units 10 and 11 are elevated to make the turn and the trailing end of the elevator 14 is elevated to avoid striking the box sides of the trailer or hopper, not shown, towed by the tractor to receive the stripped cotton from the elevator 14.

As best seen in Figure 3 the arm 24 while extending forwardly also extends inwardly toward the body of the tractor 16 from the elevator 14 and the arm 26 extends outwardly at the pivot 30, an additional link arm 38 being secured to the link arm 31 depending from the crank arm 35 of the bell crank 28.

Referring now to the stripper unit 10, as best seen in Figures 1 and 2, the stripper unit 10 comprises a housing or casing 36 which is open at the mid-point or throat to accommodate rows of cotton plants passing therebetween. The housing 36 is secured to suitable frame members, generally indicated as 37 into which is journaled a pair of stripper rolls 38, which are disposed at an angle to the surface of the ground, preferably about 30°, the stripper rolls being horizontally or laterally spaced with respect to one another to accommodate passage of plants therebetween so that cotton bolls may be stripped from the plant as described later. Disposed under the rearward ends of the stripper rolls 38, and at a lesser angle than that of the stripper rolls are the conveyor-augers 40, which extend throughout the entire length of the stripper rolls but diverge slightly at their forward ends so that the augers are adjacent and slightly below the outer sides of the stripper rolls 38 at their forward ends. The rearward ends of the augers 40 extend rearwardly of the stripper rollers 38 to receive all cotton bolls stripped thereby and includes the paddle 41 for facilitating movement of the stripped bolls in the auger-conveyor 11 into the extension auger conveyor 12.

The housing 36 has the inwardly and upwardly extending body members 42 which extend upwardly, the upper ends of which are closely adjacent the mid-portion of the stripper rolls 38. The body 36 has the upwardly extending casing or housing member 44 which extends upwardly and over the upper end of the stripper rolls 38 at 46. The body members 42 and 44 form auger troughs for the augers 40, and the bottom of these troughs are perforated (not shown) to permit trash and dirt to fall to the ground.

Thus, cotton bolls stripped by the stripper rolls 38 are thrown by centrifugal force into these auger troughs and conveyed rearwardly by the augers 40 and the paddle 41 into the extension-auger 12. During this movement trash and dirt fall through the perforations in the bottom of the auger troughs thereby providing cleaner stripped cotton bolls.

It is not deemed necessary to describe in detail the various elements of the housing generally designated in its entirety by the numeral 36 and frame 37 except to point out that in general the housing 36 houses the stripper unit 10, and provides auger and conveyor troughs for the augers 11 and 12 and the elevator 14. The specific housings, however, for the augers, conveyors and elevators are described later to which specific reference numerals are applied. It should be noted, however, that the housing 36 is separated at 48 to permit pivotal movement of the stripper unit 10 about the pivot support 18 and pivotal movement of the auger 12 and elevator 14 about the pivot support 20 upon movement of the rocker or crank arm 22, as previously described. As best seen in Figure 1, the flanges 50 and 52 are secured to the housings 36 and frame 37 through which the pivot supports 18 and 20, respectively, are journaled.

The forward end of the housings 36 are provided with a pair of curved limb lifters 54 and 54' which are laterally or horizontally spaced apart and which may be formed of curved iron bars in the usual manner and each have the slide surfaces 56 and 56', respectively, so that they might slide under the low limbs and bolls and lift them up so the bolls can be removed by the stripper rollers 38. Thus, cotton plants enter the throat or opening 58 disposed between the limb lifters 54 and 54' and extending between the stripping rolls or rollers 38 where the rollers engage and by a combination wiping, batting and paddling action strip the cotton bolls from the plants.

The rollers are of particular configuration and constitute an important feature of the invention. Referring to Figure 4, where only a single roller is shown, the roller 38 comprises a pipe section or a generally cylindrical support 59, although it may be a solid member if desired, which is drilled and tapped at a plurality of places along its length and circumference, as at 60 to threadedly receive the cap screws 62. A generally tubular body of resilient material, such as plastic, rubber, neoprene and the like, as indicated by the reference numeral 64, is disposed about the support 59 and has the radially extending strip-like feathers or fingers 66 which extend longitudinally of the support 59. A plurality of longitudinally extending holder blocks 68, which may be of wood or any suitable material, are provided between each feather or finger 66 and, preferably, the holder block 68 may be of trapezoidal form, when viewed in cross-section, to snugly fit inbetween and give lateral support to the fingers 66.

If desired, the body 64 and feathers or fingers 66 may be molded in sections so that they may be interchanged to extend their life. For example, most wear occurs at the lower or forward portions of the rollers and these may be divided longitudinally into one or more sections so that they may be placed upon other portions of the support 59.

If desired crimped metal sheet channels 68a may be used instead of the wooden blocks 68, as seen in Figure 5, which in all other respects may be the same as illustrated in Figure 4. Also, if desired, the body 64 and fingers or feathers 66 may be held in place by means of substantially flat bars 68b, such as iron, steel or wood, of Figure 6 which are of relatively thin depth. This, of course, permits extended finger area for the same length of fingers with respect to the arrangements illustrated in Figures 4 and 5 and permits of more flexible finger strips 66 when desired.

It should be noted that while eight radially extending strip-like fingers or feather 66 are illustrated, any desired number may be used, it only being necessary that the fingers 66 be spaced sufficiently far apart so that they perform the desired stripping action on the plant to remove the cotton bolls. The finger 66 and body portions 64 may be molded or otherwise formed and may be integral or may be made up in a plurality of sections, such as shown in U. S. Patent No. 2,657,514, November 3, 1953 (filed April 4, 1951) entitled Cotton Picker with Fluffer. Thus, the fingers 66 and the body portions 64 may be divided into two or more sections along the axial length of the rollers or may be divided laterally with respect to the axis of the rollers, as previously mentioned. Preferably, the fingers 66 should be sufficiently flexible so that a wiping action in addition to a beating and batting action is produced on the plants to remove the bolls. The more flexible the fingers 66, the less wiping action, and, conversely, the stiffer the fingers 66 the more wiping or licking action and more beating and batting action. By providing the flexible fingers 66 a reduced amount of green bolls and trash are removed from the cotton plants. It should be noted that the feathered fingers may be placed on the supporting core either longitudinally parallel to each other or they may be placed thereon so that they spiral around the core, the former being presently preferred.

While only a single stripper roll is illustrated in Figures 4, 5 and 6, ordinarily a pair will be used in which the fingers 66 of the respective stripper rolls are preferably in interleaving or intermeshing relationship, as shown in Figures 7 and 8.

Referring again to Figures 1 and 2, the stripper roll shafts 59 are journaled at their forward ends, as at 70, in the housing frame 37 and at their rearward ends in the housing frame 47, as at 72. The stripper roll shafts 59 are provided with the bevel gears 74 meshing with the bevel gears 76 secured to the laterally extending gear shaft 78 journaled in the housing frame 47.

Similarly, the helix 80 of the auger 40 is disposed about the shaft 82, the forward end of which is journaled in the housing frame 37, as at 84, and the rearward end of which is journaled in the housing frame 47, as at 86. A bevel gear 88 is provided on the rearward end of the auger-shaft 82 which meshes with the driving gear 90 secured to the gear shaft 92 which is journaled as at 94 in the housing frame 47.

The extension-auger-conveyor 12 includes the shaft 96 which is journaled in the housing frame 49, as at 98 and 100, and is provided with a pulley 102 on its rearward end. A helix 104 is provided about the shaft 96 for rearward conveyance of cotton bolls from the auger unit 11. It is noted that the auger-conveyor 12 is disposed rearwardly of the auger-conveyor 11 of the stripper unit 10 and has its forward end projecting under the rearward end of the conveyor 11 so that cotton bolls stripped from the plants by the stripper rolls 38 fall by gravity and momentum of rotation of the stripper rolls 38 into the auger-conveyor 11 and are conveyed upwardly and rearwardly and are moved by the paddle 41 and fall by gravity into the extension-auger-conveyor 12 which conveys them into the elevator 14. It is noted that the extension-auger 12 may comfortably be supported below the axle 21 of the tractor 16 and be pivotally supported by the pivot support 20 linked to and depending from the axle 21.

Any suitable type elevator 14 may be provided, such as the endless belt type 106 disposed about a pair of spaced rollers or shafts 108 (only one being shown) and which is provided with the laterally extending lifting members 109. The endless belt 106 and associated elements are confined in the housing 110 which forms a continuation of the housing 49 of the extension-auger 12. If desired, a pivoted door 112 may be provided at the lower and rearward portion of the housing 110 to permit the removal of green bolls, trash and foliage from the plants from the elevator 14.

A pair of drive shafts 114 and 116 are provided on the tractor 16 to which are secured the pulleys or sheaves 118, 120 and 121, respectively, which drive the V-belts 122, 124 and 125 which are connected thereto and which engage the pulleys or sheaves 102, 126, 128 and 129, respectively, to provide a drive for the rollers 38, the augers 40, the extension auger shaft 96, and the elevator 106. As best seen in Figure 1, and idler pulley 130 is provided which engages the underside of the endless V-belt 124 to provide tension therein. Thus, rotation of the driving pulley 118 drives the V-belt 122 which drives the pulley 102 and thereby rotates the auger shaft 96 thereby rotating the extension-auger drive 12 for conveying stripped bolls into the elevator 14. Similarly, rotation of the driving pulley 120 rotates the V-belt 124 which in turn drives the driven pulleys 126 and 128 thereby driving the shafts 92 and 78, respectively, and the conveying augers 40 and stripping rolls 38, respectively. Preferably, and as best seen in Figures 7 and 8 the stripper rolls 38 are driven in opposite directions and the fingers 66 tend to lift the cotton bolls into the auger troughs. The augers 40 preferably are driven opposite to that of each companion stripper roll and, hence, opposite to each other. Similarly, rotation of the driving pulley 121 drives the V-belt 125 which in turn drives the pulley 129 on the shaft 108 thereby driving the endless belt 106 so that the bolls may be elevated to a suitable receptacle or hopper (not shown) which may be secured to and towed behind the tractor 16.

It will be understood that any suitable driving arrangement may be utilized to drive the various elements; however, the arrangement illustrated and described is particularly advantageous due to its simplicity and flexibility in that by providing variable size sheaves or pulleys, these may be interchanged to provide different rates of speed of rotation of the various elements so that the type of cotton being stripped, the volume and condition of the plants may be taken into consideration and the stripper operated in the most efficient manner.

It should be noted that upon elevating the rearward end of the elevator 14, the sheave or pulley wheels 102 and 129 will be elevated somewhat and the pulley wheels 126 and 128 will be moved rearwardly slightly thereby releasing the tension on the V-belts 122, 124 and 125 so that the cotton bolls are not conveyed when the elevator 14 and stripper assembly 10 are in elevated position. As mentioned previously, this prevents bolls from being dropped on the ground when making a turn as the trailer or hopper at that time is to one side of the elevator 14.

In operation the stripper assembly 10, including the auger-conveyor 11, the conveyor 12, and elevator 14 are mounted on the side of a tractor or like vehicle 16 in any desirable manner, such as by the arrangement illustrated and described. The operator as he drives the tractor along the rows causes the cotton plants to be stripped to move in the throat 58 between the limb lifters 54 and between the stripping rollers 38. The rollers 38 preferably have their fingers 66 in intermeshing or interleaving position (although they may be adjacent but not in intermeshing position as shown in Figures 7 and 8) so that they alternately engage the cotton bolls yet they are sufficiently spaced apart so that they do not unduly bend the cotton plants thereby minimizing damage to the plants. The flexible fingers 66 engage and by a combination wiping, batting and beating action remove the matured cotton bolls from the plants, leaving a maximum amount of green bolls. As best seen in Figures 7 and 8 the rollers 38 are rotating in opposite directions, that is in a lifting movement toward the outer housing walls 44 so that stripped cotton bolls are thrown by centrifugal action and by gravity into the auger troughs of the augers 40, which convey them upwardly and rearwardly to the extension-auger assembly 12, which in turn conveys the bolls to the elevator 14 where they are conveyed upwardly into a trailer (not shown) which is secured and moved by the tractor 16. Preferably, the lower portions of the casing members 36 and 110 are perforated, such as shown in U. S. Patent No. 2,654,201, October 6, 1953, entitled Cotton Stripper Machine, to permit dirt and trash to fall through, but yet are of a size which prevents the passage therethrough of the stripped cotton bolls.

It should be noted that the peripheral speed of the stripper rolls may be independent of the rate of forward movement of the tractor 16; however, a peripheral speed of the stripper rolls 36 much greater than that of the forward speed of the tractor is presently preferred.

When it is desired to make a turn, the rocker or crank arm 22 may be actuated to move in a clockwise direction, by conventional control means, not shown, on the tractor 16 which elevates the forward end of the stripper assembly 10 and the rearward end of the elevator 14 thereby permitting a turn at the same time elevating the elevator 14 so that the elevator does not strike the trailer high boards, not shown. As mentioned, this elevation automatically causes a slackening of tension in the V-belts driving the various elements so that movement of the various parts is stopped while making the turn thereby preventing the conveying of cotton bolls upwardly and out the rearward end of the elevator 14 and onto the ground, the trailer not being directly behind the rearward end of the elevator 14 when making the turn. After the turn has been completed, the rocker arm or crank 22 may be returned to the position illustrated in Figure 1 and another row of cotton plants stripped as described.

It will be understood that while only a single stripping assembly and associated parts are shown as mounted on one side of the tractor, this is done for ease of description, and a similar or another stripper unit of the same type may be mounted on the other side of the tractor 16 so that a pair of rows may be stripped at the same time.

It will be also understood that the stripper roll construction may be used with any type of stripper assembly, conveyor and the like and it is within the scope of the invention to use these rollers in any and all types of cotton stripping apparatus.

Field tests establish that the stripping rolls of the present invention have advantages over regular metal or rigid type stripping rolls and brush type rolls. Most efficient results were obtained in the field by the stripping rolls of the present invention. The brush rolls were more efficient than the metal rolls, but the brush rolls tended to diverge outwardly at their free ends and thus the more the brush rolls were used, the less space between adjacent brush strips and thus less efficiency.

It is apparent that the present invention is well suited to carry out the objects set forth and attains the advantages mentioned as well as others inherent therein. Also, while the present invention has been described with great particularity, it is apparent that many changes in details and rearrangement of parts may be made within the spirit of the invention and within the scope of the appended claims.

What is claimed is:

1. A cotton boll stripper adapted to be assembled in a cotton stripper for engaging cotton plants and stripping cotton bolls therefrom comprising, a support, a central tubular body section surrounding the support, a plurality of strips extending axially and projecting radially from said body section, said strips formed of a flexible material so that said cotton bolls are stripped by said strips by a combination wiping, beating and batting action, and means securing the body section and strips to the support.

2. A cotton boll stripper roller adapted to be assembled in a stripper unit for stripping cotton bolls from plants comprising, a support adapted to be rotatably secured in the stripper assembly, a tube like body member disposed about and surrounding the support, strips extending axially and projecting radially from the support, said strips and body being integral and formed of flexible material, and holder members holding the body and strips on the support.

3. A cotton boll stripper roll adapted to be assembled in a stripper unit for stripping cotton bolls from plants comprising, a support adapted to be rotatably secured in the stripper unit, a plurality of strips formed of flexible material mounted on and longitudinally-extending and radially-projecting from the support, each such strip including a body portion disposed about at least a portion of the support, and longitudinally-extending holder members holding said body portions and said strips on the support, one each of said holder members disposed between each said strip and engaging and securing said body portions to said support.

4. A cotton boll stripper roll adapted to be assembled in a stripper unit for stripping cotton bolls from plants comprising, a support adapted to be rotatably secured in the stripper unit, a plurality of body member sections disposed about and surrounding the support, said sections being arranged on said support in endwise relationship, strips extending longitudinally and projecting radially from the body members, said strips and body member sections being integral and formed of flexible material, and holder members holding the body and strips on the support.

References Cited in the file of this patent

UNITED STATES PATENTS

| | | |
|---|---|---|
| 908,637 | Appleby | Jan. 5, 1909 |
| 1,069,997 | Appleby | Aug. 12, 1913 |
| 1,789,803 | Boone | Jan. 20, 1931 |
| 2,075,448 | Lundquist et al. | Mar. 30, 1937 |
| 2,401,152 | Hagen | May 28, 1946 |
| 2,406,058 | Boone | Aug. 20, 1946 |
| 2,475,531 | Towsend | July 5, 1949 |
| 2,503,128 | Neighbour et al. | Apr. 4, 1950 |
| 2,508,966 | Neighbour et al. | May 23, 1950 |
| 2,532,065 | Hyman | Nov. 28, 1950 |
| 2,538,166 | Roscoe et al. | Jan. 16, 1951 |
| 2,660,849 | Knowles | Dec. 1, 1953 |
| 2,669,821 | Hyman et al. | Feb. 23, 1954 |
| 2,673,440 | Sawyer et al. | Mar. 30, 1954 |
| 2,677,227 | Caldwell | May 4, 1954 |
| 2,717,482 | Hill | Sept. 13, 1955 |